NON-DESTRUCTIVE READ-OUT CIRCUIT UTILIZING TUNNEL DIODE

Filed Sept. 24, 1965

United States Patent Office 3,437,839
Patented Apr. 8, 1969

3,437,839

NON-DESTRUCTIVE READ-OUT CIRCUIT UTILIZING TUNNEL DIODE

Masao Kawashima, Shigehiko Hinoshita, and Maroshi Hoshino, Yokohama-shi, Japan, assignors to Fujitsu Limited, Kawasaki, Japan, a corporation of Japan Filed Sept. 24, 1965, Ser. No. 490,047
Claims priority, application Japan, Sept. 26, 1964, 39/55,157
Int. Cl. H03k *1/00*
U.S. Cl. 307—238 9 Claims

ABSTRACT OF THE DISCLOSURE

A bistable circuit comprises a transistor and a tunnel diode having a negative resistance characteristic connected to the base electrode of the transistor and having two stable operating points. An output is connected to the collector electrode of the transistor. A read-out pulse is directly supplied to one terminal of the tunnel diode for producing a zero output signal at the output when the read-out pulse is smaller in magnitude than the barrier potential without changing the operating point of the device and for producing an output signal at the output when the read-out pulse is larger in magnitude than the barrier potential and the bistable circuit is in its other stable state of operation without changing the operating point of the tunnel diode.

DESCRIPTION OF THE INVENTION

The present invention relates to a read-out circuit. More particularly, the invention relates to a non-destructive read-out circuit for read-out of binary signals from a storage.

The known storage circuits may include those which utilize negative resistance devices having "N" or "S" voltage-current characteristics. The negative resistance devices function as a bistable circuit having two stable states, one stable state being the set condition and representing the one, "1" or signal binary signal and the other stable state being the reset condition and representing the zero, "0" of no signal binary signal. In the known read-out circuits, however, the stored data is destroyed or erased by the read-out operation. Furthermore, the read-out circuits are rather complex and involved.

The principal object of the present invention is to provide a new and improved read-out circuit.

An object of the present invention is to provide a read-out circuit for read-out of binary signals from a storage.

Another object of the present invention is to provide a read-out circuit of simple structure which is efficient, effective and reliable in operation.

In accordance with the present invention, a read-out circuit comprises a bistable circuit having one stable state of operation representing the "0" binary signal and another stable state of operation representing the "1" binary signal. The bistable circuit comprises a transistor having an emitter electrode, a base electrode, a collector electrode, an emitter-base path between the emitter and base electrodes and a barrier potential between the base and emitter electrodes, and a tunnel diode connected at one end to the base electrode of the transistor and a bias voltage source applying a bias voltage to the other end of the tunnel diode in a manner whereby the bias voltage source, the tunnel diode and the emitter-base path of the transistor are connected in series circuit arrangement. An output is connected to the collector electrode of the transistor. A read-out pulse is supplied to the bistable circuit and produces a zero output signal at the output when the read-out pulse is smaller in magnitude than the barrier potential and produces an output signal at the output when the read-out pulse is larger in magnitude than the barrier potential and the bistable circuit is in its other stable state of operation.

In order that the present invention may be readily carried into effect, it will now be described with reference to the accompanying drawing, wherein.

Figure 1:
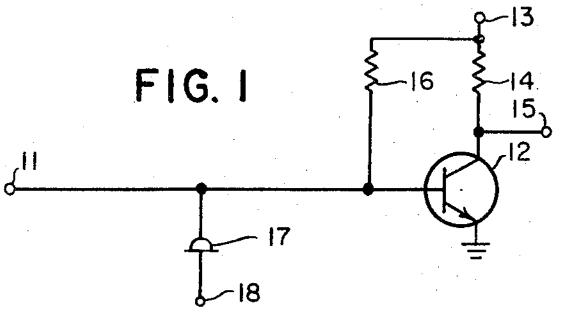
FIG. 1 is a circuit diagram of an embodiment of the read-out circuit of the present invention.
Figure 4:
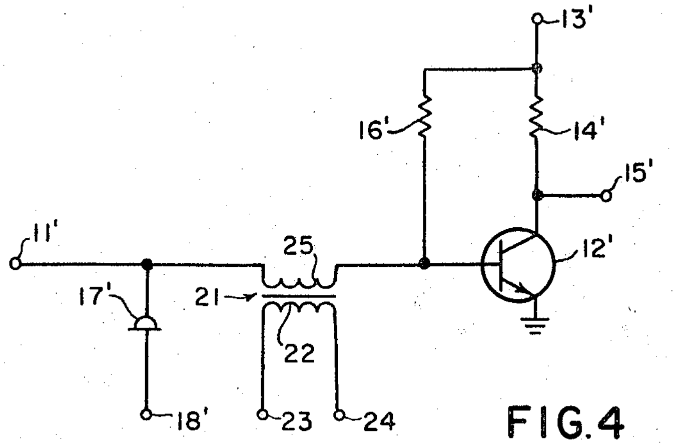

FIGS. *3a*, *3b* and *3c* are waveforms appearing in the embodiment of FIG. 1; and FIG. 4 is a circuit diagram of another embodiment of the read-out circuit of the present invention.

In FIG. 1, an input terminal 11 is connected to the base electrode of a transistor 12 having an emitter electrode, a base electrode and a collector electrode. The transistor 12 is of NPN type and the emitter electrode thereof is connected to a point at ground potential. The collector electrode of the transistor 12 is connected to a bias voltage source applied to a terminal 13 via a collector resistor 14. An output terminal 15 is connected to the collector electrode of the transistor 12. The bias voltage terminal 13 is connected to the base electrode of the transistor via a base resistor 16 which functions as the input impedance of such transistor.

A tunnel or Esaki diode 17 is connected to the base electrode of the transistor 12. The anode of the tunnel diode 17 is connected to the base electrode of the transistor 12 and the cathode of said tunnel diode is connected to a voltage terminal 18 to which a bias voltage for the said tunnel diode is applied. The load or collector resistor 14, the bias voltage applied to the terminal 13 and the bias voltage applied to the terminal 18 are selected to provide bistable operation of the circuit.

The tunnel or Esaki diode may comprise any suitable negative resistance device of such type, such as, for example, that described and illustrated in Computer Basics, vol. 6, Solid-State Computer Circuits by Technical Education and Management, Inc., Howard W. Sams & Co., Inc., The Bobbs-Merrill Company, Inc., 1962, pp. 147 to 156.

Figure 2:
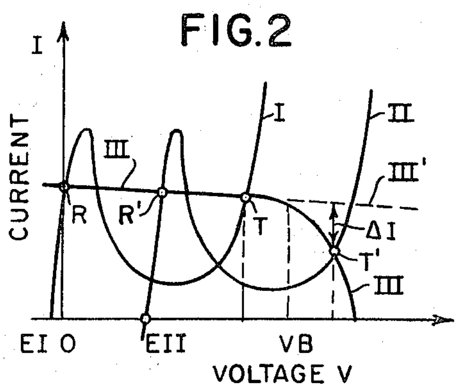
FIG. 2 is a graphical illustration explaining the operation of the embodiment of FIG. 1.

FIG. 2 illustrates current-voltage characteristics of the tunnel diode 17. The abscissa represents the voltage in volts and the ordinate represents the current. Curve I of FIG. 2 illustrates the current-voltage characteristic of the tunnel diode 17 when the tunnel diode bias voltage applied to the terminal 18 has a magnitude EI and curve II of FIG. 2 illustrates the current-voltage characteristic of the tunnel diode when the tunnel diode bias voltage applied to the terminal 18 has a magnitude EII. Curve III illustrates the current-voltage characteristic of the rest of the circuit.

The input current supplied to the input terminal 11 is the read-in or write signal and is not under consideration here. When only the current through the resistor 16 is taken into consideration, the current-voltage characteristic of the remainder of the circuit is as indicated by the broken line curve III'. When the tunnel diode biasing voltage VT exceeds the barrier potential VB between the base and emitter electrodes of the transistor 12, the input impedance of said transistor is decreased and the current-voltage characteristic of the remainder of the circuit is as indicated by the solid line curve III.

The potential across the tunnel diode 17, when the tunnel diode biasing voltage has a magnitude EI, provides the stable points R and T at the intersections of the curves I and III. The stable point R corresponds to the "0" binary signal and the stable point T corresponds to the "I" binary signal. The binary signals are read-out by supplying a read-in or write current to the input terminal 11 to establish the correspondence of the stable points with the binary signals. After read-in or writing the read-in current may be decreased to zero.

In accordance with the present invention, a read-out operation is provided by applying a read-out pulse to the tunnel diode 17 via the terminal 18. The tunnel diode biasing voltage has a magnitude EII and provides the stable points R′ and T′ at the intersections of the curves II and III. The stable point R corresponding to the "0" binary signal changes to R′, which is of lower voltage than the barrier potential VB between the base and emitter electrodes of the transistor 12, so there is no current flow to said transistor and the output voltage between the output terminal 15 and the point at ground potential does not change.

The stable point T corresponding to the "I" binary signal changes to T′, which is of higher voltage than the barrier potential VB, so that a current ΔI flows to the transistor 12 as base current, is amplified by said transistor, and appears as an output voltage at the output terminal 15 thereby reading out the "I" binary signal. After read-out, the tunnel diode biasing voltage is again decreased to the magnitude EI and the operation returns to the stable points R and T, so that the read-out is performed without destruction of the stored data.

Figure 3A:
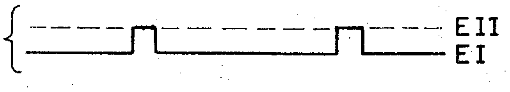
Figure 3B:
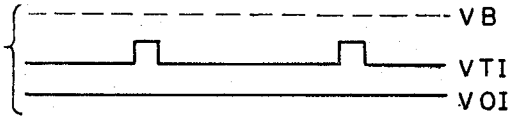

FIG. 3*a* shows the tunnel diode biasing voltage applied to the terminal 18 when it is applied as a read-out signal, the different magnitudes EI and EII being shown. FIG. 3*b* shows the potential VTI at the base electrode of the transistor 12 when the circuit operation is at the "0" binary signal stable point, the barrier potential VB which is of higher magnitude than the potential VTI, and the output voltage VOI which is then constant.

Figure 3C:
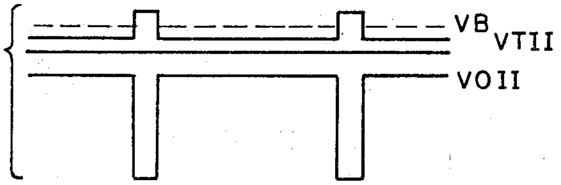

FIG. 3*c* shows the potential VTII at the base electrode of the transistor 12 when the circuit operation is at the "I" binary signal stable point, the barrier potential VB which is of lower magnitude than the potential VTII, and the output voltage VOII. The barrier potential VB is utilized as a reference level in the read-out circuit of the present invention so that if it varies due to temperature change, etc., such variation may be compensated by varying the tunnel diode biasing voltage or read-out voltage applied to the terminal 18 in the same manner. The read-out voltage applied to the terminal 18 may be utilized to simultaneously read-out a plurality of bistable circuits.

The embodiment of FIG. 4 is identical to that of FIG. 1 and the voltages in the tunnel diode branch are the same in both embodiments, except that the read-out signals are applied to the circuit in a different manner. Thus, in the embodiment of FIG. 4, a read-out transformer 21 has a primary winding 22, to which the read-out voltage is applied via terminals 23 and 24, and a secondary winding 25 connected to the base electrode of the transistor 12′ in the emitter-base path of said transistor between said transistor and the connection point of the tunnel diode 17′ with said base electrode.

While the invention has been described by means of specific examples and in specific embodiments, we do not wish to be limited thereto, for obvious modifications will occur to those skilled in the art without departing from the spirit and scope of the invention.

We claim:

a bistable circuit having one stable state of operation representing the "0" binary signal and another stable state of operation representing the "1" binary signal, said bistable circuit comprising a transistor having an emitter electrode, a base electrode, a collector electrode, an emitter-base path between said emitter and base electrodes and a barrier potential between said base and emitter electrodes, and a device having a negative resistance characteristic connected to the base electrode of said transistor and having two stable operating points and two terminals;

output means connected to the collector electrode of said transistor; and read-out means for supplying a read-out pulse directly to one terminal of the device of said bistable circuit for producing a zero output signal at said output means when said read-out pulse is smaller in magnitude than said barrier potential without changing the operating point of said device and for producing an output signal at said output means then said read-out pulse is larger in magnitude than said barrier potential and said bistable circuit is in its other stable state of operation without changing the operating point of said device.

2. A read-out circuit as claimed in claim 1, wherein said device comprises a tunnel diode.

3. A read-out circuit as claimed in claim 2, wherein said read-out pulse is supplied to said tunnel diode and is effective as the voltage across said tunnel diode.

4. A read-out circuit as claimed in claim 1, wherein said device comprises a tunnel diode connected at one end to the base electrode of said transistor and another end, said read-out circuit further comprising bias voltage means for applying a bias voltage to the other end of said tunnel diode in a manner whereby said bias voltage means, said tunnel diode and the emitter-base path of said transistor are connected in series circuit arrangement.

5. A read-out circuit as claimed in claim 4, wherein said read-out pulse is supplied to the other end of said tunnel diode and is effective as the voltage across said tunnel diode.

6. A read-out circuit as claimed in claim 1, wherein said read-out pulse is supplied to said device and is effective as the voltage across said device.

7. A read-out circuit, comprising:

a bistable circuit having one stable state of operation representing the "0" binary signal and another stable state of operation representing the "1" binary signal, said bistable circuit comprising a transistor having an emitter electrode, a base electrode, a collector electrode, an emitter-base path between said emitter and base electrodes and a barrier potential between said base and emitter electrodes, and a device having a negative resistance characteristic connected to the base electrode of said transistor;

output means connected to the collector electrode of said transistor;

read-out means for supplying a read-out pulse to said bistable circuit for producing a zero output signal at said output means when said read-out pulse is smaller in magnitude than said barrier potential and for producing an output signal at said output means when said read-out pulse is larger in magnitude than said barrier potential and said bistable circuit is in its other stable state of operation; and transformer means having a secondary winding connected to the base electrode of said transistor in the emitter-base path thereof between said device and said transistor and a primary winding in operative proximity with said secondary winding, said read-out pulse being supplied to the primary winding of said transformer.

8. A read-out circuit as claimed in claim 7, wherein said device comprises a tunnel diode.

9. A read-out circuit as claimed in claim 7, wherein said device comprises a tunnel diode connected at one end to the base electrode of said transistor and another end, said read-out circuit further comprising bias voltage means for applying a bias voltage to the other end of said tunnel diode in a manner whereby said bias voltage means, said tunnel diode and the emitter-base path of said transistor are connected in series circuit arrangement.

References Cited

UNITED STATES PATENTS 3,359,427 12/1967 Miller et al. ---------- 307—322

ARTHUR GAUSS, *Primary Examiner.*

DONALD D. FORRER, *Assistant Examiner.*

U.S. Cl. X.R.

307—286, 322